2,968,547
PRODUCTION OF PLUTONIUM METAL

Ward L. Lyon and Raymond H. Moore, Richland, Wash., assignors to the United States of America as represented by the United States Atomic Energy Commission No Drawing. Filed Dec. 18, 1959, Ser. No. 860,613

14 Claims. (Cl. 75—84.1)

This invention deals with a method of producing plutonium metal and in particular with a process of reducing plutonium chloride with magnesium.

The reduction of plutonium chloride, and in particular of plutonium trichloride, with magnesium has been tried; however, satisfactory results could not be obtained. The yield was too low because of unfavorable change of free energy, and excessive losses of plutonium metal occurred due to its high solubility in the magnesium chloride formed. It was found, for instance, that the plutonium was 17 times as soluble in magnesium chloride as in magnesium metal.

It is an object of this invention to provide a process of producing plutonium metal in which losses are reduced to a minimum and thus a good yield is obtained.

It is another object of this invention to provide a process of producing plutonium metal in which the plutonium formed enters almost quantitatively the metal phase.

It is finally another object of this invention to provide a process of producing plutonium metal by the reduction of plutonium chloride under favorable thermodynamic conditions.

It was found that when an alkali metal chloride, such as potassium chloride or sodium chloride, is used as the solvent for the plutonium chloride to be reduced, the thermodynamics of the reaction is more favorable than when plutonium chloride without the solvent of this invention is reduced; this improvement apparently is due to the formation of the complex compound $KCl \cdot MgCl_2$ or $K^+$ and $MgCl_3^-$ ions. The reaction then probably proceeds according to the equation:

$$KCl + 2KPuCl_4 + 3Mg \rightleftharpoons 3KMgCl_3 + 2Pu$$

The process of this invention thus comprises dissolving plutonium chloride in a molten alkali metal chloride; and adding magnesium metal to the chloride mixture, whereby a complex alkali metal-magnesium chloride and plutonium metal are formed and the plutonium metal preferentially enters a metal phase formed of excess metal.

Potassium and/or sodium chloride are satisfactory for the process of this invention; however, the eutectic mixture of the two chlorides is preferred. Another salt combination that has proved excellently suitable for the process of this invention is a mixture of potassium chloride and aluminum chloride. Here, to, the ratio of the potassium chloride and the aluminum chloride may vary widely; equimolar quantities were found preferable. The potassium chloride should be present in considerably greater quantity than is necessary to complex all of the magnesium chloride formed as the compound $KCl \cdot MgCl_2$. If aluminum chloride is present, magnesium has to be used in at least a quantity sufficient to reduce both the plutonium chloride and the aluminum chloride; it is preferably added in the form of a magnesium-aluminum alloy. However, a considerable excess of magnesium, for instance of from 25 to 30%, is preferred. If alkali metal chlorides are used as the solvent without any aluminum chloride, the magnesium is preferably added in the form of magnesium-zinc alloy. The zinc does not participate in the reaction; however, it increases the density of the metal phase, thus prevents it from floating on the salt and protects it against oxidation. The zinc also provides an inert diluent for the plutonium. The product in this case is a plutonium-zinc-magnesium alloy.

The quantity of the salt to be added as the solvent for the plutonium chloride may vary widely. It was found, though, that a minimum of plutonium is lost by dissolution in the salt phase formed if the volumes of liquid metal phase and molten salt phase are approximately equal. For this reason it is best to add quantities of magnesium alloy and of salt that yield about equal volumes when in the molten condition. The reaction temperature of the plutonium chloride with the magnesium is between 700 and 800° C., a temperature of about 750° C. representing the optimum. An equilibration time of from 10 to 30 minutes is sufficient.

The plutonium-containing metal phase can be separated from the salt phase after solidification, or by decantation of the molten phases. The plutonium is then isolated by evaporating the zinc and/or magnesium metal. Zinc is preferably removed by sublimation, while the magnesium is removed by melting the separated metal phase under a high vacuum. Alternatively the magnesium can be removed by titrating the metal phase with molten zinc chloride or zinc chloride dissolved in a potassium chloride-sodium chloride mixture, whereby magnesium and zinc metal form. The end point is reached when the plutonium chloride begins to form, which is noticeable by the appearance of the typical blue color in the mixture.

Instead of using plutonium chloride as the starting material, plutonium dioxide can also be employed. The dioxide is then fed into an alkali metal chloride-aluminum chloride solution, whereby the aluminum chloride functions as the chlorinating agent and converts the plutonium oxide to the chloride. The magnesium is then added to the mixture and reduction is carried out as described above.

In the following examples a few embodiments of the process of this invention are illustrated.

Example I

A quantity of 0.4355 gram of plutonium dioxide was dissolved in 3.00 grams of an equimolar mixture of potassium chloride-aluminum chloride that had a temperature of 750° C. After the mass had been held for 30 minutes at this temperature, 3.093 grams of a magnesium-aluminum alloy containing 20% by weight of magnesium and 4.0 grams of sodium chloride-potassium chloride eutectic were added to the reaction mass. The mixture was allowed to react for about 20 minutes; after this the container was chilled and the metal and salt phases were separated by decantation. The metal button was washed in dilute hydrochloric acid, and the solution obtained was added to the salt phase together with more hydrochloric acid. An acid solution formed; it was analyzed and found to contain 0.0300 gram of plutonium which was 7.78% of the total plutonium initially present. The metal phase was then dissolved, also in hydrochloric acid, and found to contain 0.355 gram of plutonium which corresponds to about 92.0% of the total plutonium present.

Example II

Into a quartz test tube there were charged 0.78 gram of plutonium trichloride, 4.014 grams of sodium chloride-potassium chloride eutectic and 3.7645 grams of a magnesium-zinc alloy having a magnesium content of 9.08%. The mass was heated to 750° C., and the temperature was maintained for 10 minutes. The salt phase obtained was white which indicated essentially complete reduction.

The tube with the content was then quenched in cold water, and the solidified phases were separated from each other. The metal button weighed 4.1957 grams. The metal phase was heated to 600° C. for two hours in a quartz tube under a vacuum of $1 \times 10^{-6}$ mm. Hg, whereby both zinc and magnesium were sublimed. The salt phase was dissolved and analyzed; it contained 4.42% of the plutonium originally present. The plutonium metal also was dissolved in dilute hydrochloric acid; the solution formed was found to contain 95.18% of the total plutonium originally present. Then the practically empty quartz tube was rinsed with hydrochloric acid and these washings were also analyzed for plutonium; they contained 0.69% of the initial plutonium content.

*Example III*

Plutonium dioxide was dissolved in an equimolar mixture of potassium chloride and aluminum chloride. The ratio of salt and plutonium dioxide was varied as shown in the table below. The salt mixture formed was divided into equal portions, and each portion was introduced into a quartz test tube containing a magnesium-aluminum alloy having 20% by weight of magnesium; the quantities of alloy in the various tubes differed from each other. In all cases, however, the amounts of magnesium exceeded the quantity needed to reduce all of the aluminum chloride and all of the plutonium chloride formed. The reaction was carried out at between 700 and 750° C. After 30 minutes, when the reaction was believed to be complete, the metal and salt phases were separated from each other; each phase was dissolved in hydrochloric acid and analyzed for plutonium. The conditions of the experiments and the results are shown in the table below.

| Tube No. | Percent Excess Mg | Ratio, Wt. Metal/Wt. Salt | Distribution Coefficient a | Percent Pu Chloride Reduction |
|---|---|---|---|---|
| 1 | 59 | 1.45 | 32.5 | 73.4 |
| 2 | 72 | 1.57 | 33.2 | 67.8 |
| 3 | 104 | 1.88 | 90.0 | 84.7 |
| 4 | 149 | 2.29 | 272 | 89 | a Distribution coefficient is $\frac{\text{g. Pu in metal/g. metal}}{\text{g. Pu in salt/g. salt}}$.

It was found by calculation from the above data that, when equal volumes of salt phase and metal phase are provided, at least 96% of the plutonium chloride will be reduced.

It will be understood that this invention is not to be limited to the details given herein but that it may be modified within the scope of the appended claims.

What is claimed is:

1. A process of producing plutonium metal comprising dissolving plutonium chloride in molten alkali metal chloride; adding magnesium metal to the chloride mixture; maintaining a temperature of between 700 and 800° C., whereby a plutonium-containing metal phase and a magnesium-chloride-containing salt phase are formed, said alkali metal chloride being used in at least the same molar quantity as that of the magnesium chloride formed; and separating said metal phase from said salt phase.

2. The process of claim 1 wherein the alkali metal chloride and the magnesium metal are added in a quantity to yield about equal volumes of salt phase and metal phase.

3. The process of claim 1 wherein the temperature is about 750° C.

4. The process of claim 1 wherein the alkali metal chloride is a mixture of sodium chloride and potassium chloride.

5. The process of claim 4 wherein the sodium chloride-potassium chloride mixture has eutectic composition.

6. The process of claim 4 wherein magnesium is added in the form of a binary magnesium-containing zinc-base alloy.

7. The process of claim 1 wherein the alkali metal chloride is a mixture of potassium chloride and aluminum chloride.

8. The process of claim 7 wherein the potassium chloride and aluminum chloride are present in equimolar quantites.

9. The process of claim 7 wherein magnesium is added in at least a quantity sufficient to reduce all plutonium chloride and aluminum chloride present.

10. The process of claim 9 wherein magnesium is added in a quantity excessive by from 25 to 30% over the amount required for the reduction of plutonium and aluminum chlorides.

11. The process of claim 9 wherein the magnesium is added in the form of a binary magnesium-containing aluminum-base alloy.

12. The process of claim 1 wherein the alkali metal chloride is added in greater than stoichiometric quantity with regard to the formation of the alkali metal magnesium double chloride of equimolar proportions.

13. A process of producing plutonium metal comprising adding plutonium dioxide to a molten alkali metal chloride-aluminum chloride mixture whereby plutonium chloride is formed and dissolved in the salt; maintaining said salt mixture at from 700 to 800° C.; adding a magnesium-aluminum alloy to the salt mixture in a quantity excessive by about 25 to 30% over the quantity required to reduce the plutonium chloride and aluminum chloride present; and separating a plutonium-containing metal phase from said salt.

14. The process of claim 13 wherein the alkali metal chloride-aluminum chloride mixture is equimolar and the temperature is maintained at about 750° C.

References Cited in the file of this patent

UNITED STATES PATENTS 2,894,832    Magel _____ July 14, 1959

OTHER REFERENCES

Progress in Nuclear Energy, Series III, Process Chemistry, vol. 2, 1958, pp. 191, 192. (Copy in Scientific Library.)